United States Patent
Shibasaki et al.

[11] Patent Number: 6,118,611
[45] Date of Patent: Sep. 12, 2000

[54] SIGNAL REPRODUCING CIRCUIT ADAPTED TO HEAD UTILIZING MAGNETO-RESISTIVE EFFECT

[75] Inventors: Hidekazu Shibasaki, Higashine; Hiroaki Ueno; Ken Yakuwa, both of Kawasaki, all of Japan

[73] Assignee: Fujitsu Limited, Kawasaki, Japan

[21] Appl. No.: 08/948,209

[22] Filed: Oct. 9, 1997

Related U.S. Application Data

[60] Continuation-in-part of application No. 08/772,649, Dec. 23, 1996, which is a division of application No. 08/306,210, Sep. 14, 1994, Pat. No. 5,623,378.

[30] Foreign Application Priority Data

Dec. 14, 1993 [JP] Japan .................................. 5-313447
Jun. 17, 1997 [JP] Japan .................................. 9-160323

[51] Int. Cl.[7] ................................ G11B 5/02; G11B 5/09
[52] U.S. Cl. .................................. 360/67; 360/46; 360/61
[58] Field of Search .................................. 360/46, 67, 61, 360/62

[56] References Cited

U.S. PATENT DOCUMENTS

| | | | |
|---|---|---|---|
| 3,665,485 | 5/1972 | Pear, Jr. ..................................... | 360/40 |
| 4,063,293 | 12/1977 | Perahia ..................................... | 360/62 |
| 4,597,019 | 6/1986 | Nishimoto et al. .......................... | 360/23 |
| 5,307,212 | 4/1994 | Tagiri ......................................... | 360/46 |
| 5,323,278 | 6/1994 | Contreras et al. .......................... | 360/67 |
| 5,416,645 | 5/1995 | Fukuyama .................................. | 360/46 |
| 5,430,584 | 7/1995 | Petersen ..................................... | 360/46 |
| 5,452,148 | 9/1995 | Kawai et al. ............................... | 360/67 |
| 5,488,518 | 1/1996 | Shier ......................................... | 360/67 |
| 5,717,536 | 2/1998 | Jung et al. .................................. | 360/46 |
| 5,877,911 | 3/1999 | Klaassen et al. ............................ | 360/67 |

FOREIGN PATENT DOCUMENTS

| | | |
|---|---|---|
| 0595350 A2 | 5/1994 | European Pat. Off. . |
| 785404 | 3/1995 | Japan . |
| 7169003 | 7/1995 | Japan . |
| 7169009 | 7/1995 | Japan . |
| 7311902 | 11/1995 | Japan . |

OTHER PUBLICATIONS

IBM Technical Disclosure Bulletin; "Recovery Circuit for Magneto–Resistive Head Switching"; vol. 33, No. 4, Sep. 1990.

*Primary Examiner*—Paul Loomis
*Assistant Examiner*—Regina Y. Neal
*Attorney, Agent, or Firm*—Greer, Burns, Crain, Ltd.

[57] ABSTRACT

A signal reproducing circuit for a magneto-resistive effect head includes a constant current source for supplying a sense current to an MR head in a read state, first constant current sources for supplying first constant currents to a pair of reproduction transistors in the read state, and a capacitor connected between the emitters of the transistors. Furthermore, second constant current sources for supplying second constant currents are connected in parallel with the first constant current sources. Control is given so that when switching an idle state to the read state is commanded, the second constant current sources remain on for a given period of time. Owing to this circuitry, a transient period during which the idle state is switched to the read state or a transient period during which heads are switched in the read state can be shortened to a great extent. Consequently, superposition of an unwanted offset component on a reproduced signal can be suppressed, and a loss in data-handling capacity can be minimized.

6 Claims, 8 Drawing Sheets

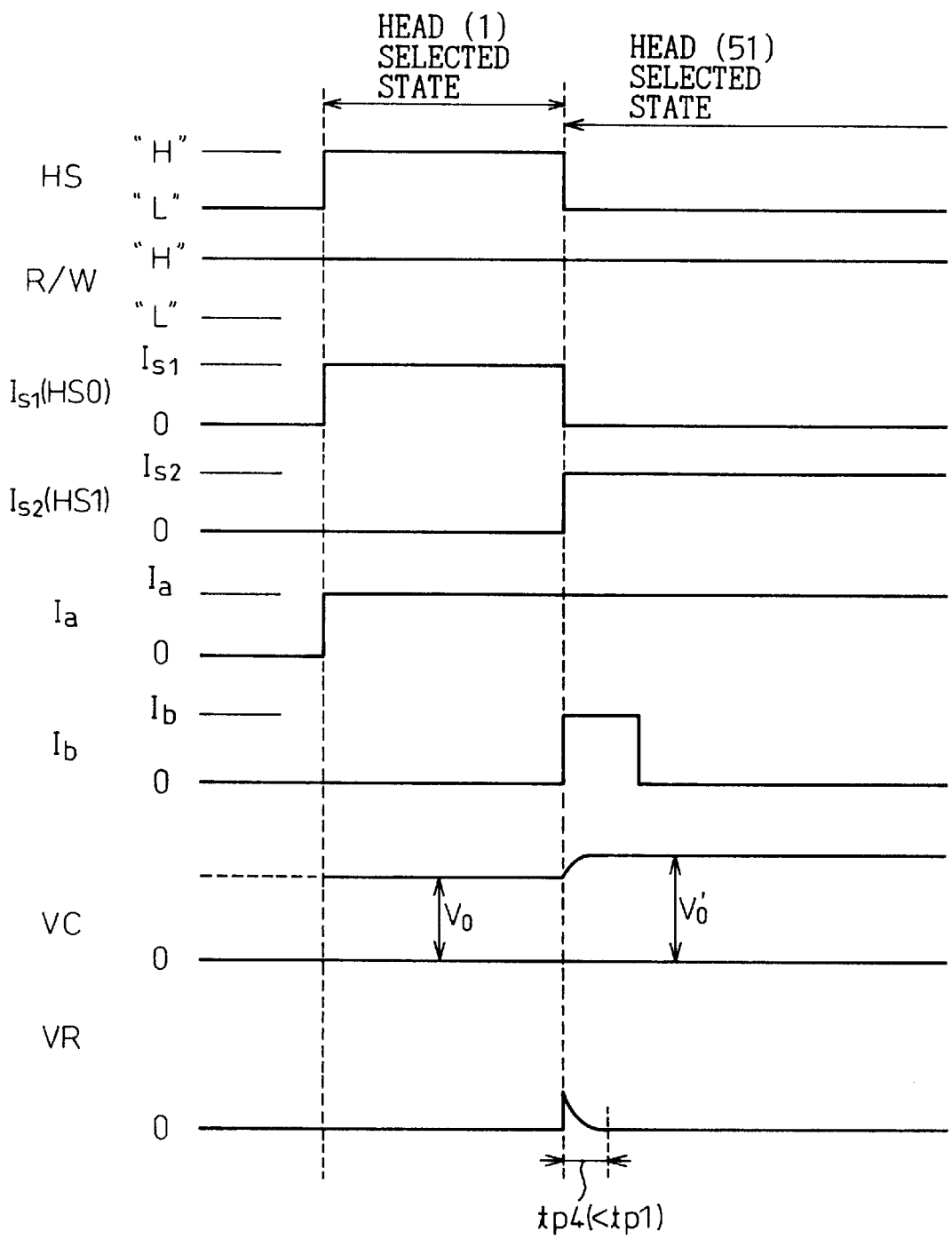

SIGNAL REPRODUCING CIRCUIT ADAPTED TO HEAD UTILIZING MAGNETO-RESISTIVE EFFECT

CROSS-REFERENCE TO RELATED APPLICATIONS

This patent application is a continuation-in-part of the patent application Ser. No. 772,649 filed on Dec. 23, 1996 and now pending, which is a divisional of Ser. No. 08/306,210 filed on Sep. 14, 1994, now U.S. Pat. No. 5,623,378.

BACKGROUND OF THE INVENTION

1. Field of the Invention

The present invention relates to a signal reproducing circuit in a magnetic recording and reproducing apparatus. More particularly, this invention is concerned with a technique for swiftly recovering the signal reproducing circuit from a transient phenomenon, which derives from an inter-terminal voltage of a reproducing head using an element utilizing a magneto-resistive effect (hereinafter referred to as an MR head) and occurs when an idle state is switched to a read state or MR heads are switched in the read state, in the course of reproducing data from a magnetic recording medium using the MR head.

2. Description of the Related Art

In recent years, the operating speed and storage capacity of a magnetic recording and reproducing apparatus such as a magnetic disk unit has become higher and larger. To permit higher recording density, accordingly, an MR head is being used exclusively for reproduction of data instead of an ordinary inductive thin film magnetic head. This is attributable to the fact that when the MR head is used to reproduce data, since a signal magnetic field independent of the relative speed of a magnetic recording medium in relation to the MR head can be detected, the recording density can be raised by lowering the running speed of the magnetic recording medium. However, the MR head suffers from an unpreferable transient phenomenon deriving from an inter-terminal voltage of the MR head and occurring when an idle state is switched to a read state or heads are switched in the read state. There is therefore an increasing demand for a technique of resolving the transient phenomenon.

FIG. 1 shows the circuitry of a signal reproducing circuit for an MR head in accordance with a prior art, and FIG. 2 shows waveforms indicating operation timing.

In FIG. 1, one terminal of an MR head 1 is connected to a connection line 90 and high-potential power line V1 (for example, 5 V) via a resistor 22, and also connected to the base of an npn transistor I constituting a reproduction amplifier (read amplifier) on the first stage. The other terminal of the MR head 1 is connected to a low-potential power line V2 (for example, 0 V) via a resistor 3 and constant current source 4, and also connected to the base of an npn transistor 8 constituting the read amplifier on the first stage. The collector of the transistor 7 is connected to an output terminal RX and to the power line V1 via a resistor 5. The collector of the transistor 8 is connected to an output terminal RY and to the power line V1 via a resistor 6. Moreover, the emitter of the transistor 7 is connected to one terminal CX of a capacitor 9 and to the power line V2 via a constant current source 10. The emitter of the transistor 8 is connected to the other terminal CY of the capacitor 9 and to the power line V2 via a constant current source 11. The output terminals RX and RY are connected to a demodulation system (not shown).

Moreover, there are shown a Chip Enable signal CE, Read/Write control signal RW, and an AND gate 12 responsive to the Chip Enable signal CE and Read/Write control signal R/W. The constant current source 4 is turned on or off in response to the Chip Enable signal CE. The constant current sources 10 and 11 are turned on or of f in response to an output of the AND gate 12. When the Chip Enable signal CE is low, a magnetic recording and reproducing apparatus including this circuit is brought to an idle state. When the Chip Enable signal CE is high, the magnetic recording and reproducing apparatus is brought to a read or writing state. When the Read/Write control signal R/W is high, a read state is selected. When the Read/Write control signal is low, a writing state is selected.

In this circuitry, when the Chip Enable signal CE is low, that is, the magnetic recording and reproducing apparatus is in the idle state, the constant current sources 4, 10, and 11 are all off. When the Chip Enable signal CE is high, the constant current source 4 is turned on to supply a constant current Is. When the Chip Enable signal CE is high and the Read/Write control signal R/W is high, that is when the magnetic recording and reproducing apparatus is in the read state, the constant current sources 10 and 11 are turned on to supply a constant current Ia.

A current supplied over the power line V1 in the read state flows into the power line V2 by way of the connection line 90, resistor 2, MR head 1, resistor 3, and constant current source 4; flows into the power line V2 by way of the resistor 5, transistor 7, and constant current source 10; and flows into the power line V2 by way of the resistor 6, transistor 8, and constant current source 11.

When the constant current Is (serving as a sense current used to detect a magnetic field in a magnetic recording medium) flows through the MR head 1, a potential difference develops at the terminals of the MR head 1 due to an internal resistance of the MR head. This causes an offset voltage to develop between the bases of the transistors 7 and 8. A current flowing into the transistor 7 therefore becomes larger than a current flowing into the transistor 8. A potential difference equivalent to the offset voltage develops between the output terminals RX and RY.

The capacitor 9 accumulates or releases a charge so as to cancel the potential difference, that is, the offset voltage. The inter-terminal voltage VC of the capacitor 9 balances the emitter voltages of the transistors 7 and 8. The constant current Ia supplied from the constant current sources 10 and 11 therefore flows into the transistors 7 and 8.

Consequently, a signal (output signal VR) whose voltage alternates with a change in internal resistance of the MR head 1 due to a change in magnetic field, that is, a signal whose amplitude changes with the change in magnetic field is output to the output terminals RX and RY. Ideally, an unwanted offset voltage is not sent out.

As mentioned above, in the read state, a bias magnetic field must be applied to the MR head 1 in order to cause the sense current Is to flow. An offset voltage therefore develops at the terminals of the MR head 1. For preventing amplification of the offset voltage, the constant current sources 10 and 11 are used to pass the current Ia into the read amplifier (transistors 7 and 8) on the first stage. This causes a potential difference V0 equivalent to the offset voltage to develop between the terminals CX and CY of the capacitor 9 (See FIG. 2). In short, the offset voltage developing at the terminals of the MR head 1 is canceled with the operation of the capacitor 9. As a result, the output voltage VR developing between the output terminals RX and RY becomes 0 (in other words, the offset voltage is 0). No problem occurs.

By contrast, in the idle state, the sense current Is must be cut off to prevent deterioration of the MR element. As this time, no offset voltage develops at the terminals of the MR head 1. The inter-terminal voltage VC of the capacitor 9 is therefore 0. The output signal VR developing between the output terminals RX and RY is therefore 0 (that is, the offset voltage is 0). No problem occurs.

However, a problem occurs during a transient period during which the idle state is switched to the read state. Specifically, during the transient period, a quick or ideally instantaneous transition must be made from a state in which the inter-terminal voltage VC of the capacitor 9 is 0 (a state in which no charge is accumulated in the capacitor 9) to a state in which the inter-terminal voltage VC equals to a potential difference V0 (a state in which a charge proportional to a potential difference equivalent to the offset voltage is accumulated in the capacitor 9). However, since the capacitor 9 has a considerable time constant, it is unfeasible to realize such an ideal state transition. The offset voltage relative to the MR head 1 cannot therefore be canceled completely by means of the capacitor 9 during the transient period. A transient influence (a spike shown in FIG. 2) proportional to the offset voltage appears in the output signal VR. The transient hinders reproduction of a signal. The transient period should therefore be as short as possible.

Moreover, in the case of a signal reproducing circuit having a plurality of MR heads, when MR heads are switched in the read state, a problem similar to the above one occurs. Specifically, the internal resistances of the MR heads are not always the same but are usually different from one another because of errors occurring during a manufacturing process. Under the circumstances, when MR heads are switched in the read state, a fluctuation in inter-terminal voltage VC of the capacitor 9 occurs during the transient period during which the heads are switched. This is attributable to a difference in inter-terminal voltage between the MR heads deriving from a difference in internal resistances between the MR heads. As a result, a transient influence (a spike in FIG. 2) proportional to the fluctuation in inter-terminal voltage VC appears in the output signal VR.

As mentioned above, the signal reproducing circuit for an MR head in accordance with the prior art has a problem in that, since an unwanted offset voltage is superposed on a reproduced signal during the transient period during which the idle state is switched to the read state or heads are switched in the read state, demodulation cannot be carried out accurately.

Moreover, during the transient period during which the offset voltage develops, data cannot be read from a magnetic recording medium. A gap (an area carrying no data) whose length is proportional to the transient period is formed between data blocks. The storage capacity of a magnetic disk unit must therefore be reduced by an amount of data that can otherwise be stored. This results in a loss in data-handling capacity.

SUMMARY OF THE INVENTION

An object of the present invention is to provide a signal reproducing circuit in a magnetic recording and reproducing apparatus using an MR head which makes it possible to suppress superposition of an unwanted offset component on a reproduced signal by making a transient period, during which an idle state is switched to a read state or heads are switched in the read state, as short as possible, and to eventually minimize a loss in data-handling capacity.

According to a first aspect of the present invention, there is provided a signal reproducing circuit for a magneto-resistive effect head comprising: first and second power lines to which different voltages are applied; a connection line to which the first power line, and one terminal of a magneto-resistive effect head for reproducing a signal from a magnetic recording medium in a read state are connected via a resistor; a first constant current source, connected to the other terminal of the magneto-resistive effect head via a resistor and connected between the resistor and the second power line, for supplying a sense current into the magneto-resistive effect head in the read state; a pair of transistors having collectors thereof connected to the first power line via resistors and responding to a voltage developed at one terminal of the magneto-resistive effect head and the other terminal thereof; second and third constant current sources, connected between the emitters of the pair of transistors and the second power line, for supplying a constant current to the pair of transistors in the read state; a capacitor connected between the emitters of the pair of transistors; fourth and fifth constant current sources connected in parallel with the second and third constant current sources; and a circuit for giving control so that when switching an idle state to the read state is commanded, the fourth and fifth constant current sources remain on for a given period of time.

According to the constituent features in the first aspect, control is given so that when switching of the idle state to the read state is commanded, the fourth and fifth constant current sources remain on for a given period of time. During the given period of time, an original constant current supplied from the second and third constant current sources as well as an additional constant current supplied from the fourth and fifth constant current sources flows into the pair of transistors constituting a read amplifier. In short, the emitter currents of the transistors constituting a read amplifier increase temporarily. This causes a charge accumulated in the capacitor to increase temporarily. The capacitor can therefore be charged quickly to a given potential.

Thus, the time required for charging the capacitor is relatively shortened. As a result, the transient period during which the idle state is switched to the read state gets shorter. Superposition of an unwanted offset voltage on a reproduced signal which is observed in the prior art can be suppressed. Moreover, a period during which data can be read from a magnetic recording medium gets longer by the time by which the transient period is shortened. Consequently, a loss in data-handling capacity can be minimized.

Also, according to a second aspect of the present invention, there is provided a signal reproducing circuit for a magneto-resistive effect head comprising: first and second power lines to which different voltages are applied; a connection line to which the first power line, and one terminal of the magneto-resistive effect head for reproducing a signal from a magnetic recording medium in a read state are connected via a resistor; a first constant current source, connected to the other terminal of the magneto-resistive effect head via a resistor and connected between the resistor and the second power line, for supplying a sense current to the magneto-resistive effect head in the read state; a pair of transistors having collectors thereof connected to the first power line via resistors and responding to a voltage developed at one terminal of the magneto-resistive effect head and the other terminal thereof; second and third constant current sources, connected between the emitters of the pair of Transistors and the second power line, for supplying a constant current to the pair of transistors in the read state; a capacitor connected between the emitters of the pair of transistors; and a dummy head circuit for applying a potential difference equivalent to an offset voltage, which develops at the terminals of the magneto-resistive effect head in the read state, to the capacitor in an idle state.

According to the constituent features in the second aspect, the dummy head circuit applies a potential difference equivalent to an offset voltage, which develops at the terminals of the MR head in the read state, to the capacitor in the idle state. When the idle state is switched to the read state, the fluctuation in inter-terminal voltage of the capacitor can be minimized. In other words, when the idle state is switched to the read state, charging the capacitor to a given potential (VC=V0 in FIG. 2) must be started with the inter-terminal voltage of the capacitor set to 0 according to the prior art. However, according to the present invention, the charging can be started with the equivalent potential difference (potential difference equivalent to the offset voltage relative to the MR head) added to the inter-terminal voltage of the capacitor.

The time required for charging the capacitor to the given voltage is relatively shortened. As a result, the transient period during which the idle state is switched to the read state gets shorter. Consequently, the same effect as that in the first aspect of the present invention can be exerted.

Furthermore, according to a third aspect of the present invention, there is provided a signal reproducing circuit for a magneto-resistive effect head comprising: first and second power lines to which different voltages are applied; a plurality of connection lines to which the first power line, and one terminal of each of a plurality of magneto-resistive effect heads, each for reproducing a signal from an associated magnetic recording medium in a read state, are connected via associated resistors; a plurality of first constant current sources, connected to the other terminals of the plurality of magneto-resistive effect heads via resistors and connected between the resistors and the second power line, each for supplying a sense current to an associated magneto-resistive effect head in the read state when the associated magneto-resistive effect head is selected; a plurality of pairs of transistors, associated with the plurality of magneto-resistive effect heads, each having collectors thereof connected to the first power line via resistors, and responding to a voltage developed at one terminal of an associated magneto-resistive effect head and the other terminal thereof; second and third constant current sources, shared by the plurality of transistors and connected between the emitters of the pairs of transistors and the second power line, each for supplying a constant current to a pair of transistors associated with a selected magneto-resistive effect head in the read state; a capacitor shared by the plurality of pairs of transistors and connected between the emitters of each of the pairs of transistors; fourth and fifth constant current sources connected in parallel with the second and third constant current sources; and a circuit for giving control so that when switching one of the plurality of magneto-resistive effect heads to the other is commanded in the read state, the fourth and fifth constant current sources remain on for a given period of time.

According to the constituent features in the third aspect, control is given so that when switching MR heads, in the read state, is commanded, the fourth and fifth constant current sources remain on for a given period of time. During the given period of time, an original constant current supplied from the second and third constant current sources as well as an additional constant current supplied from the fourth and fifth constant current sources flows into a pair of transistors constituting a read amplifier. In other words, like the first aspect of the present invention, the emitter currents of the transistors constituting a read amplifier increase temporarily. This causes a charge accumulated in the capacitor to increase temporarily.

Consequently, the time required for charging the capacitor to a given potential is relatively shortened. As a result, a transient period during which heads are switched in the read state gets shorter. The same effect as that in the first aspect of the present invention can be exerted.

BRIEF DESCRIPTION OF THE DRAWINGS

Other objects and features of the present invention will be described hereinafter in detail by way of preferred embodiments with reference to the accompanying drawings, in which:

FIG. 8 is a waveform chart indicating operation timing in the circuit shown in FIG. 7.

DESCRIPTION OF THE PREFERRED EMBODIMENTS

Figure 3:
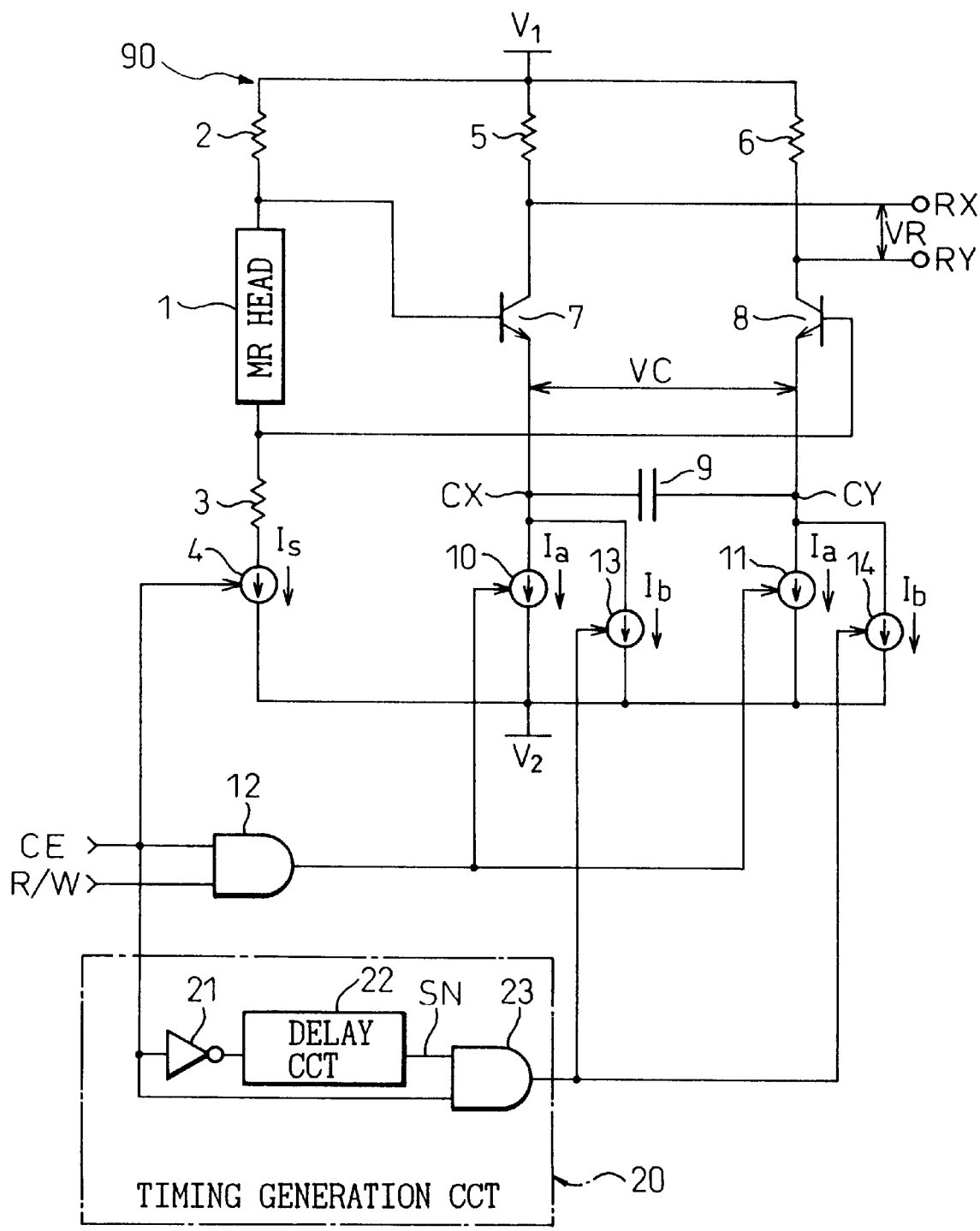
FIG. 3 is a circuit diagram showing the circuitry of a signal reproducing circuit for an MR head in accordance with the first embodiment of the present invention.
Figure 4:
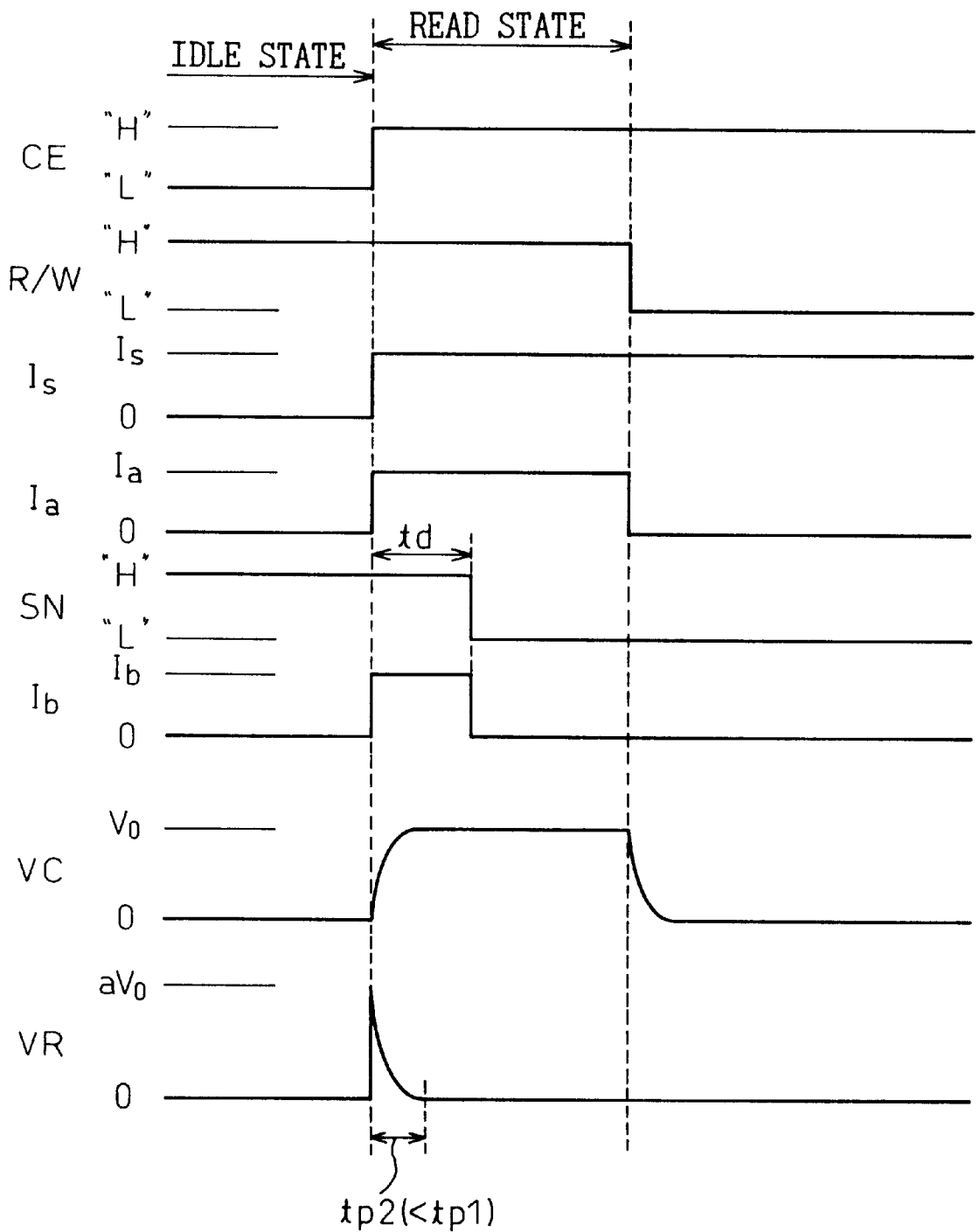
FIG. 4 is a waveform chart indicating operation timing in the circuit shown in FIG. 3.

FIG. 3 shows the circuitry of a signal reproducing circuit for an MR head in accordance with the first embodiment of the present invention, and FIG. 4 shows waveforms determining operation timing in the circuit.

Figure 1:
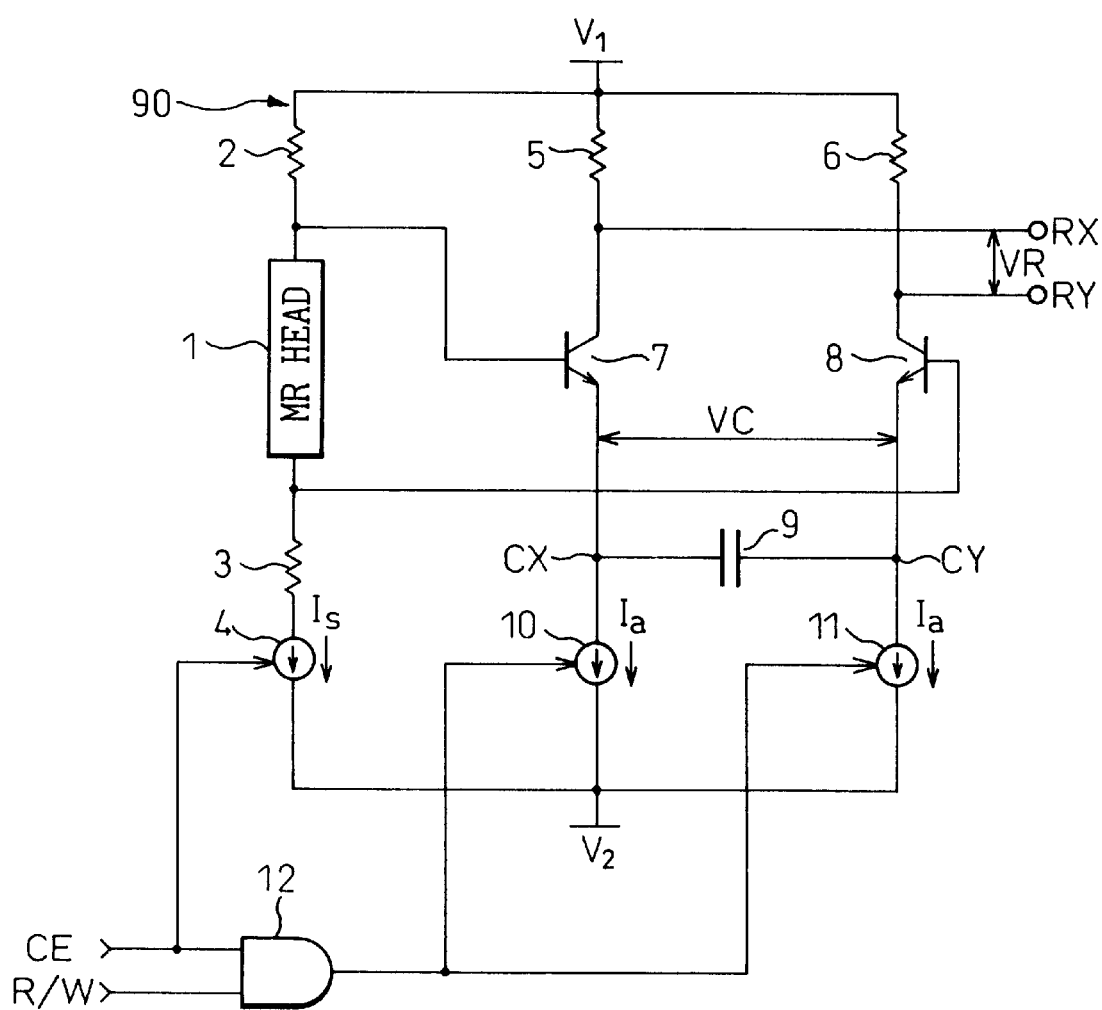
FIG. 1 is a circuit diagram showing the circuitry of a signal reproducing circuit for an MR head in accordance with a prior art.

In FIG. 3, reference numerals identical to those in FIG. 1 showing the circuitry in accordance with the prior art denote the same components. The description of the components will be omitted.

The signal reproducing circuit for an MR head in accordance with this embodiment is characterized, in comparison with the circuit shown in FIG. 1, in that: <1> constant current sources 13 and 14 for supplying a constant current Ib are connected in parallel with the constant current sources 10 and 11; and <2> a timing generation circuit 20 is included for controlling the timing of turning on or off the constant current sources 13 and 14 in response to the Chip Enable signal CE.

The timing generation circuit 20 includes an inverter 21 responsive to the Chip Enable signal CE, a delay circuit 22 for delaying an output of the inverter 21 by a given period of time (period td in FIG. 4), and an AND gate 23 for controlling the on-off operations of the constant current sources 13 and 14 in response to an output SN of the delay circuit 22 and the Chip Enable signal CE. In this embodiment, when an output of the AND gate 23 is high, the constant current sources 13 and 14 are turned on to supply the constant current Ib. When the output of the AND gate 23 is low, the constant current sources 13 and 14 are turned off.

In the circuitry, when the Chip Enable signal CE is low (that is, when the idle state is set), the constant current source 4 is off (current Is in FIG. 4 is 0). Moreover, since the output of the AND gate 12 is low, the constant current sources 10 and 11 are off (current Ia in FIG. 4 is 0). Furthermore, since the output of the AND gate 23 in the timing generation circuit 20 is low, the constant current sources 13 and 14 are off (current Ib in FIG. 4 is 0).

In this state, when the Chip Enable signal CE is driven high, the constant current source 4 is turned on to supply the constant current Is. At this time, the Read/Write control signal R/W is high (read state), and thus the output of the AND gate 12 is driven high. The constant current sources 10 and 11 are turned on to supply the constant current Ia. Moreover, when the Chip Enable signal CE is driven high, the output SN of the delay circuit 22 in the timing generation circuit 20 retains the previous state (that is, the output SN remains high). The output of the AND gate 23 is therefore driven high. The constant current sources 13 and 14 are turned on to supply the constant current Ib.

After a given delay time (td) defined by the delay circuit 22 elapses, the output SN of the delay circuit 22 is driven low. This causes the output of the AND gate 23 to go low. The constant current sources 13 and 14 are turned off.

As mentioned above, according to the circuitry of the first embodiment, control is given so that when the idle state is switched to the read state, the constant current sources 13 and 14 remain on for the given period of time td. During the given period of time td, the original constant current Ia supplied from the constant current sources 10 and 11 as well as the additional constant current Ib supplied from the constant current sources 13 and 14 flows into the emitters of the transistors 7 and 8 constituting a read amplifier. Specifically, the emitter currents of the transistors 7 and 8 become larger by the value Ib than the constant current Ia flowing in the original read state (Ia+Ib). Owing to the larger current, a charge accumulated in the capacitor 9 increases temporarily. The capacitor 9 can therefore be charged swiftly to a given potential V0.

Figure 2:
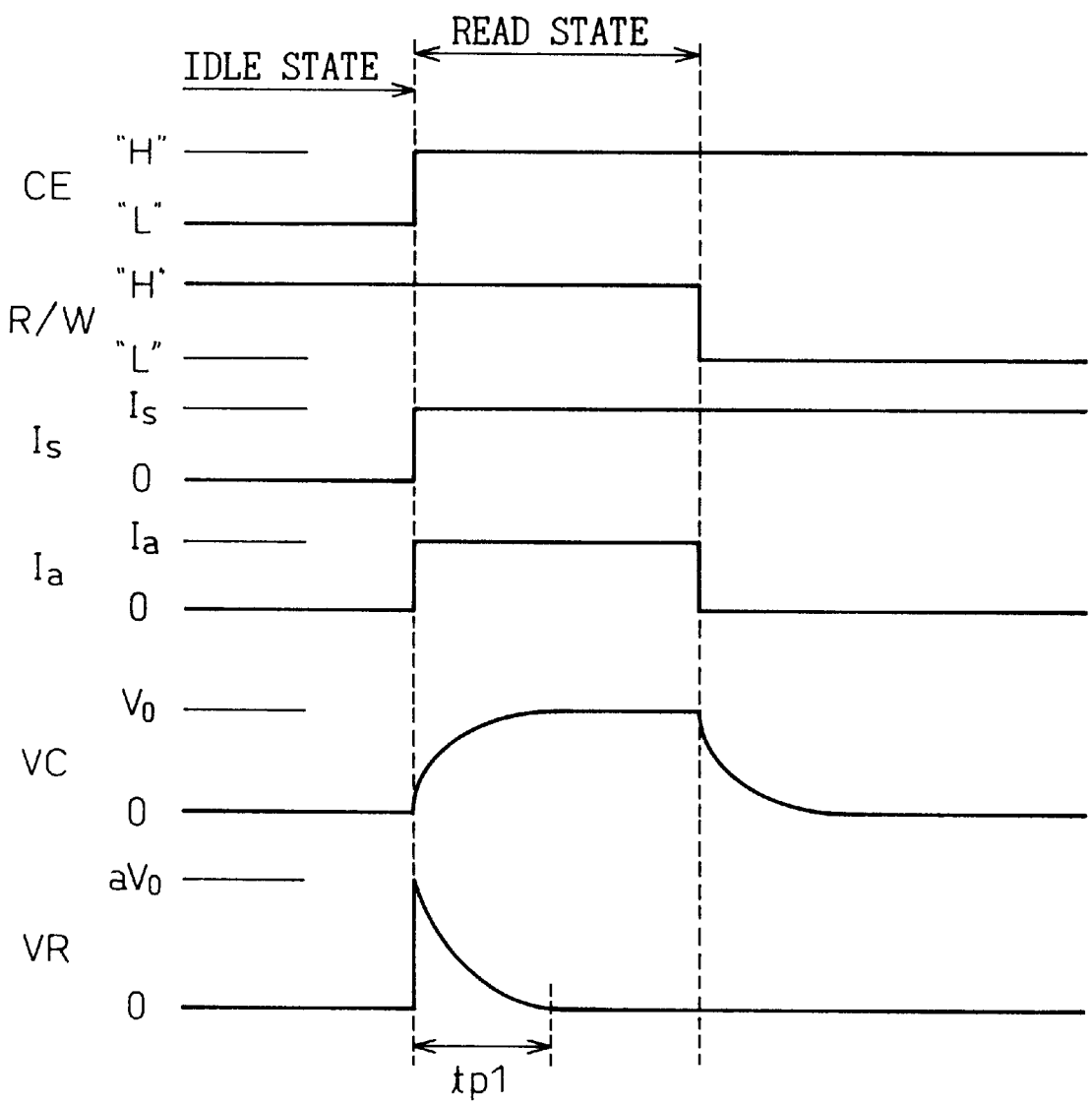
FIG. 2 is a waveform chart indicating operation timing in the circuit shown in FIG. 1.

The time required for charging the capacitor 9 is therefore shortened as compared with that in the circuitry of the prior art (See FIG. 1) in which the additional constant current sources 13 and 14 are not included. As a result, the transient period during which the idle state is switched to the read state gets relatively shorter (period tp2 in FIG. 2 that is shorter than the transient period tp1 in the prior art). Eventually, occurrence of a transient phenomenon (unwanted offset voltage) during the transient period can be suppressed to a great extent. Moreover, since tile period during which data can be read from a magnetic recording medium gets longer by the time by which the transient period is shortened, a loss in data-handling capacity can be minimized.

It should be noted that the "read state" referred to in the description of the embodiments of the present invention (the aforesaid first embodiment as well as the second and third embodiments to be described later) has a different meaning from "a read state to which a transition is made from a writing state in order to reproduce (read) data for the purpose of judging whether or not data written in response to a Write instruction has been recorded properly" described in, for example, Japanese Unexamined Patent Publication No. 7-169009. Herein, it is preconditioned that no current should flow into an MR head during writing of data. This is because if a current flowed into the MR head during writing of data, an element would be broken.

The term "read state" employed in the description of the embodiments of the present invention includes read modes (described later in item <2>) other than a state in which an ordinary Read instruction is issued (described Later in item <1>). That is to say, the following two cases are conceivable as cases in which "the idle state is switched to the read state:"

<1> a case in which a Read instruction is issued in the idle state in which no instruction has been issued from an upper-level unit; and <2> a case in which in the idle state in which no instruction has been issued from an upper-level unit, it becomes necessary to execute read in order to read servo information for the purpose of putting an MR head on the track of a given track (the position of the MR head relative to a track Is fixed so that the MR head can respond to a command immediately if any command comes).

That is to say, in the embodiments of the present invention, an operation mode of the MR head is defined depending on whether a head IC (HDIC) or an IC in the MR head is set to the idle mode or read mode. As far as recent disk units are concerned, power consumption must be reduced because the disk unit may be incorporated in a laptop personal computer or the like.

In an actual product, whichever of the writing mode or read mode is set, a bias voltage is constantly applied to an MR head during a seek operation.

(1) Discussion on the above item <1>, that is, on the case in which a read instruction is issued in the idle state.

Normally, even when no instruction is issued from an upper-level unit (personal computer or the like), a disk unit is brought to a command wait state (in which the disk unit can respond to an instruction immediately). Accordingly, processing is carried out for rotating a spindle motor to bring an MR head to a state in which the MR head waits for a given track (servo information is read not all the time but according to proper timing so that it can be monitored whether or not the MR head is located on a given track). In this state, power is consumed. Restrictions are therefore imposed on the use time of a battery-driven personal computer. When no instruction is issued from an upper-level unit for a given period of time or longer, a low-power consumption mode (that may be referred to as a sleep mode) divided into several steps is activated.

In the sleep mode that varies depending on a disk unit, components are turned off one by one with the passage of time according to such a sequence that a head IC is turned off at the first step, a voice coil motor (VCM) is turned on at the second step, a spindle motor is turned off at the third step, and the other circuits are turned off at the fourth step.

When the sleep mode is adopted, therefore, the head IC may be turned off. Even if a Read instruction comes, it may not be respond immediately. The aforesaid technique of the present invention will prove effective in such a case.

As discussed later in item (2), even when the idle state is switched to the read state in order not only to read servo information but also to activate a seek operation in response to a Read instruction, the technique of the present invention will prove effective.

(2) Discussion on the aforesaid item <2>, that is, on the case in which the idle state is switched to the read state in order to read servo information.

Reportedly, the uninterrupted flow of a current into an MR head leads to the shortened service life of the MR head. For this reason, there is a tendency toward causing as little current as possible to flow.

In practice no current flows into an MR head even at a step succeeding a sleep mode in which a head IC is turned off.

Thus, there is a tendency toward causing no current to flow in an operating system that uses an MR head from the viewpoint of the service life of the MR head. The technique of the present invention will therefore prove effective, though it has already proved effective in responding to a command instructing a transition from an idle state to a read mode. (The MR head is used to read servo information in the idle state or to read servo information in a writing state. It should therefore be noted that a Read instruction is not issued in this case.)

As mentioned previously, during a seek operation, a head IC enters the read mode and the MR head is constantly biased. However, if no command is issued for several minutes, for example, every third servo information is read.

Figure 5:
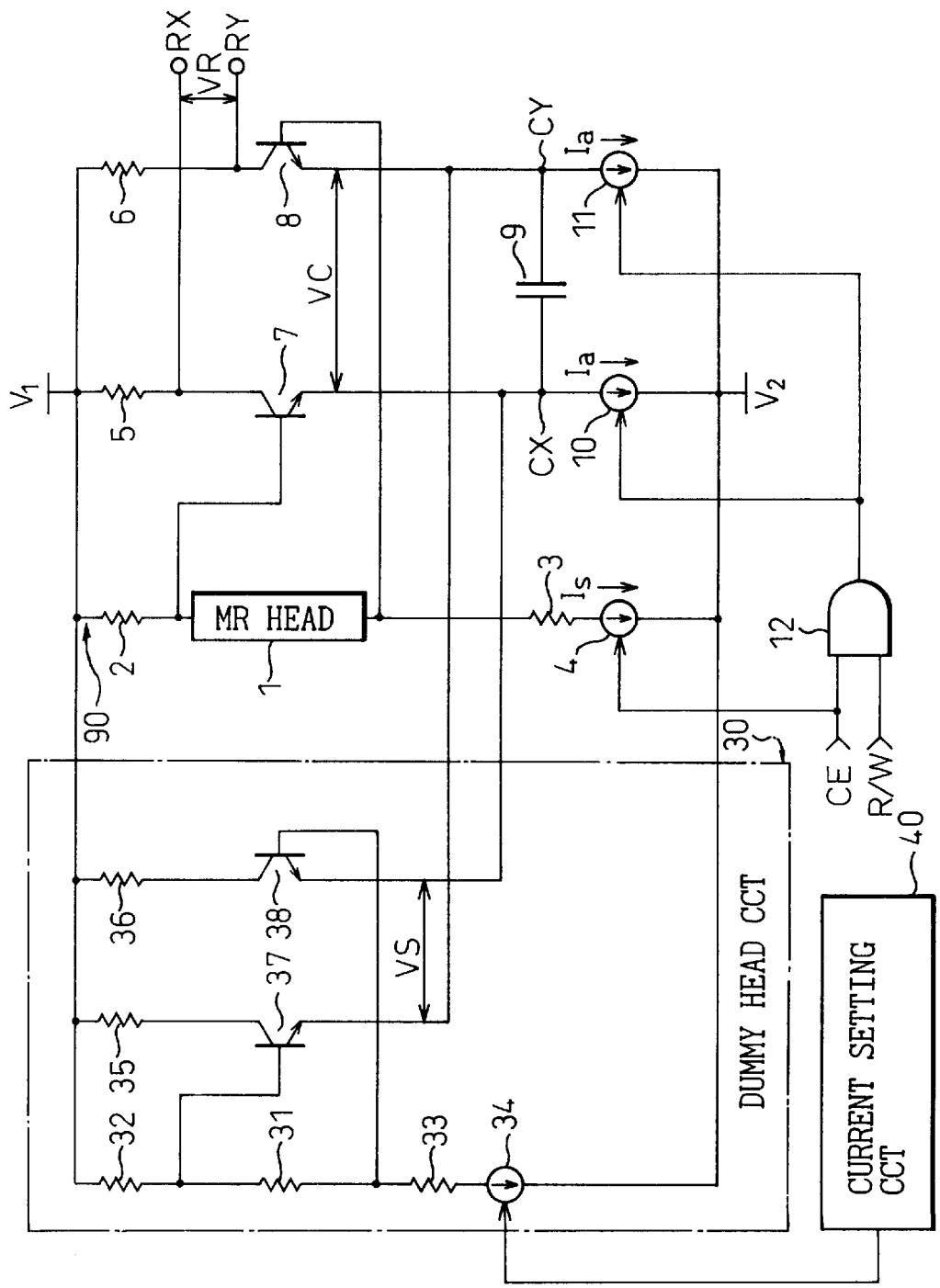
FIG. 5 is a circuit diagram showing the circuitry of a signal reproducing circuit for an MR head in accordance with the second embodiment of the present invention.
Figure 6:
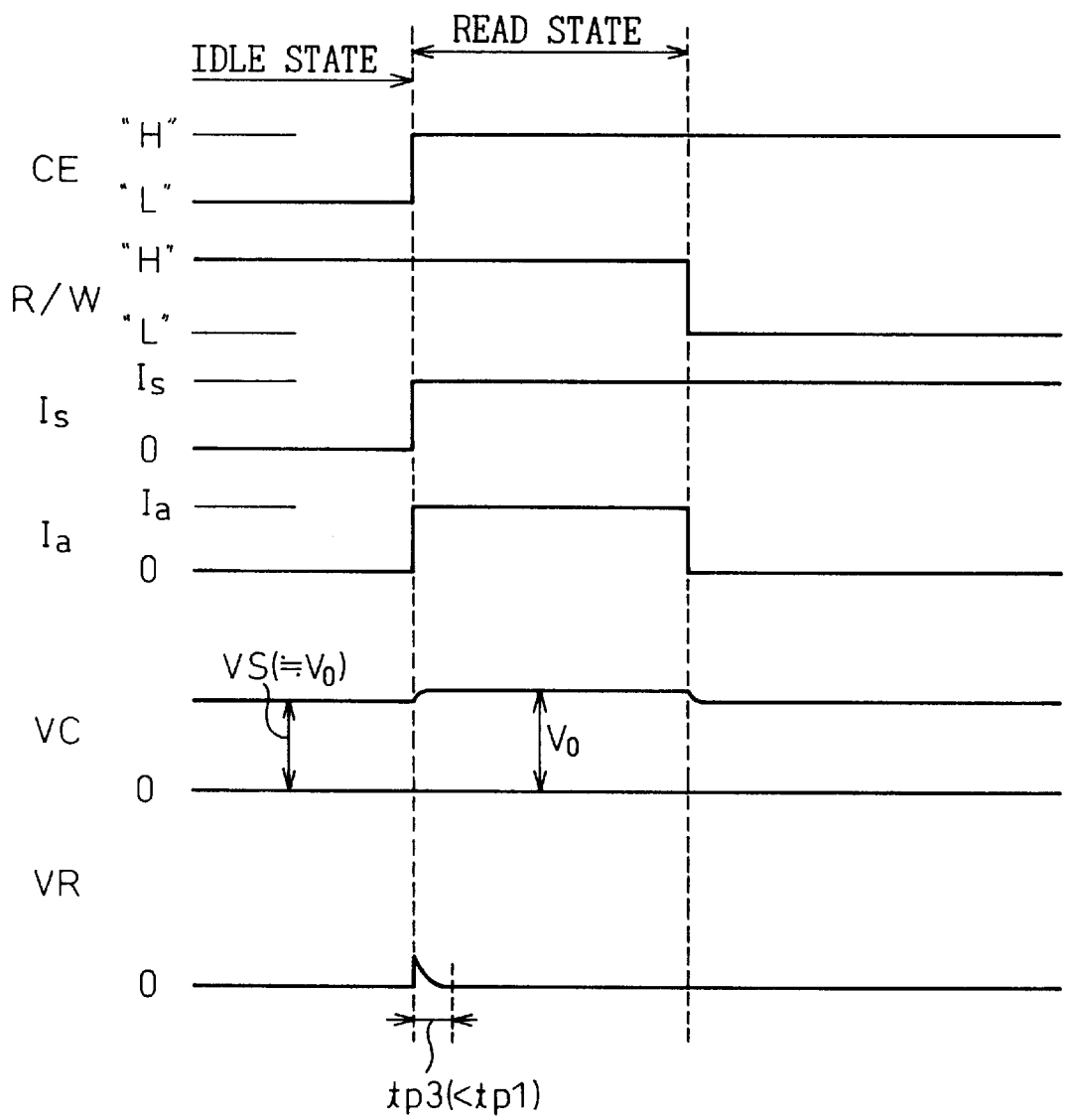
FIG. 6 is a waveform chart indicating operation timing in the circuit shown in FIG. 5.

FIG. 5 shows the circuitry of a signal reproducing circuit for an MR head in accordance with the second embodiment of the present invention, and FIG. 6 shows waveforms determining operation timing in the circuit.

In FIG. 5, reference numerals identical to those employed in FIG. 1 showing the circuitry of the prior art denote the same components. A description of these components will be omitted.

A signal reproducing circuit for an MR head in accordance with this embodiment is characterized in comparison with the circuit shown in FIG. 1 in that: <1> a dummy head circuit 30 is included for applying a specified potential difference VS to the terminals CX and CY of the capacitor 9; and <2> a current setting circuit 40 is included for making it possible to externally adjust the potential difference VS to be applied by the dummy head circuit 30.

The dummy head circuit 30 has circuitry resembling the circuitry of the signal reproducing circuit including the original MR head 1. Specifically, the dummy head circuit 30 includes a resistor 31 having a resistance identical to the internal resistance of the MR head 1, a resistor 32 connected between one terminal of the resistor 31 and the power line V1, a resistor 33 connected to the other terminal of the resistor 31, a current source 34 connected between the resistor 33 and power line V2 for supplying a current whose value is varied by the current setting circuit 40, and a pair of transistors 37 and 38 having collectors thereof connected to the power line V1 via resistors 35 and 36 and responding to a voltage developed at one terminal of the resistor 31 and the other terminal thereof. The aforesaid specified potential difference VS is measured between the emitters of the transistors 37 and 38.

In the dummy head circuit 30, a current to be supplied from the current source 34 is set to be the same as the sense current Is supplied from the constant current source 4 in the signal reproducing circuit including the original MR head 1. In a read state, therefore, ideally, the same voltage as the offset voltage developing at the terminals of the original MR head 1 develops at the terminals of the resistor 31 whose resistance is the same as the internal resistance of the MR head 1. The potential difference VS equivalent to the offset voltage develops between the emitters of the transistors 37 and 38. In this embodiment, the dummy head circuit 30 applies the potential difference VS to the capacitor 9 in an idle state (See the waveform chart of FIG. 6 indicating operation timing).

As mentioned above, according to the circuitry of the second embodiment, a potential difference equivalent to an offset voltage (V0=VS) developing at the terminals of the MR head 1 in a read state is applied to the capacitor 9 in an idle state. Therefore, when the idle state is switched to the read state, a fluctuation in inter-terminal voltage VC of the capacitor 9 can be minimized. In other words, when the idle state is switched to the read state, charging the capacitor 9 to a given potential (VC=V0 in FIG. 6) must be started with the inter-terminal voltage VC of the capacitor set to 0 according to the prior art (See FIG. 2). In this embodiment, the charging can be started with the equivalent potential difference VS added to the inter-terminal voltage VC of the capacitor.

The time required for charging the capacitor 9 to the given potential is therefore shortened greatly. As a result, the transient period during which the idle state is switched to the read state is shortened (the transient period is a period tp3 in FIG. 6 which is much shorter than the transient period tp1 in the prior art). The second embodiment can therefore exert the same effect as the first embodiment (See FIGS. 3 and 4).

Ideally, the same voltage as an offset voltage developing at the terminals of the MR head 1 in a read state develops at the terminals of the resistor 31 in the dummy head circuit 30. Both the voltages do not always agree with each other because of various factors. In this case, the current setting circuit 40 is used to properly adjust a current to be supplied from the current source 34 in the dummy head circuit 30. Thus, the aforesaid effect can be exerted reliably.

Figure 7:
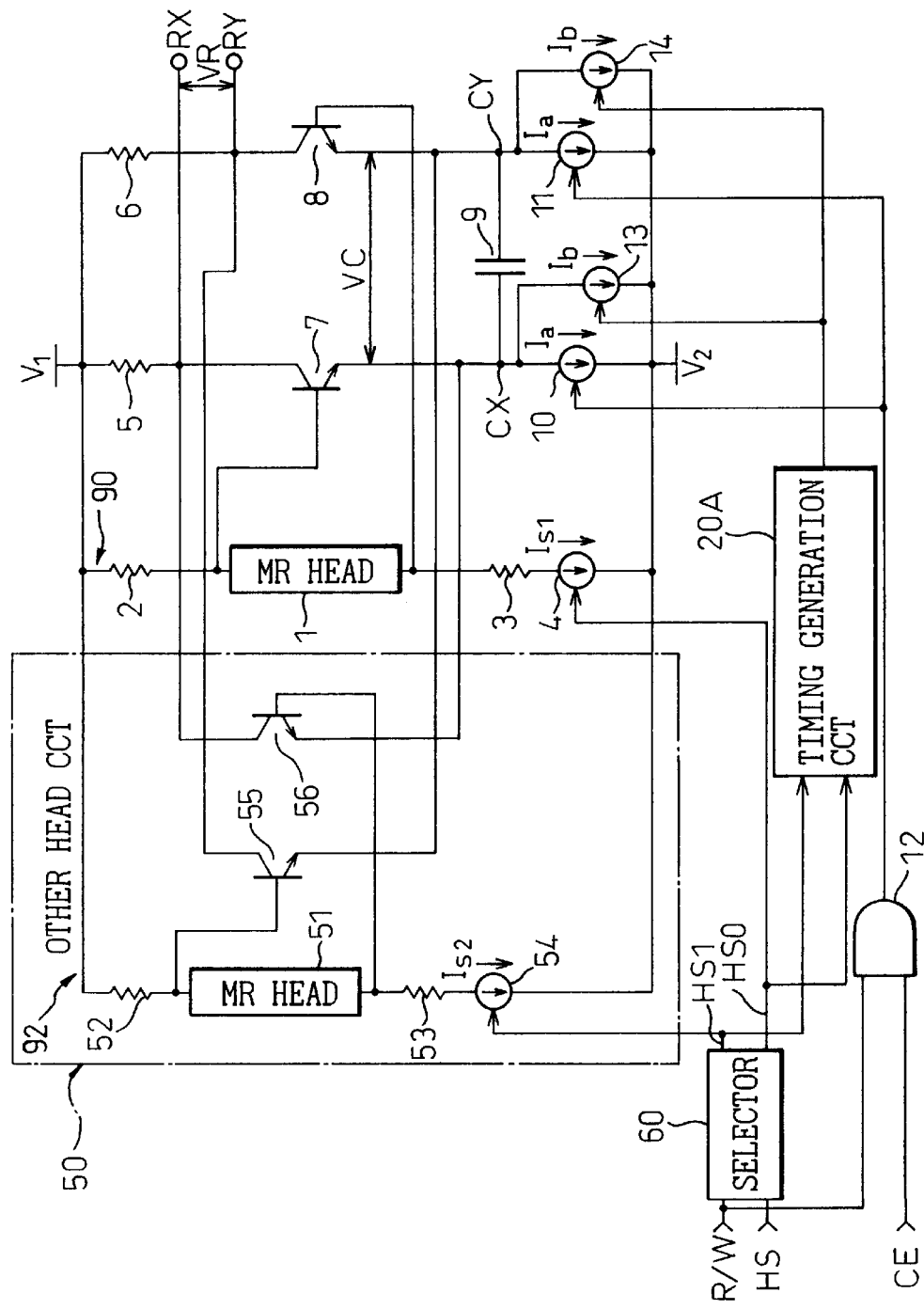
FIG. 7 is a circuit diagram showing the circuitry of a signal reproducing circuit for an MR head in accordance with the third embodiment of the present invention.

FIG. 7 shows the circuitry of a signal reproducing circuit for MR heads in accordance with the third embodiment of the present invention, and FIG. 8 shows waveforms determining operation timing in the circuit. This embodiment presents an example of the circuitry of a signal reproducing circuit including a plurality of MR heads (two MR heads 1 and 51 in the illustrated example).

In FIG. 7, reference numerals identical to those employed in FIG. 1 showing the circuitry of the prior art denote the same components. A description of these components will be omitted.

The signal reproducing circuit for MR heads in accordance with this embodiment is characterized, in comparison with the circuit shown in FIG. 1, in that: <1> constant current sources 13 and 14 for supplying a constant current Ib are connected in parallel with the constant current sources 10 and 11; <2> an other-head circuit 50 having an MR head 51 is included; <3> a selector 60 is included for outputting a head selection signal HS0 or HS1 used to bring either the MR head 1 or MR head 51 to a selected state in response to a head selection signal HS and Read/Write control signal R/W; and <4> a timing generation circuit 20A is included for controlling the timing of turning on or off the constant current sources 13 and 14 in response to the head selection signal HS0 or HS1 output from the selector 60.

The other-head circuit 50 includes the MR head 51, a resistor 52 connected between one terminal of the MR head and power line V1 and connection line 92, a resistor 53 connected to the other terminal of the MR head 51, a constant current source 54 connected between the resistor 53 and power line V2 and having the on-off operation thereof controlled with the head selection signal HS1 and a pair of transistors 55 and 56 having collectors thereof connected to the power line V1 via the resistors 6 and 5 and responding to a voltage developed at one terminal of the MR head 51 and the other terminal thereof. The emitters of the transistors 55 and 56 are connected to the terminals CY and CX of the capacitor 9.

In the circuitry of this embodiment, when the Read/Write control signal R/W is high (that is, when a read state is set, and the head selection signal HS is high, the selector 60 drives the head selection signal HS0 to high (the head selection signal HS1 is low). This brings the MR head 1 to a selected state. When the read state is set and the head selection signal HS is low, the head selection signal HS 1 is driven high (the head selection signal HS0 is low) in order to bring the MR head 51 to the selected state. When an output of the timing generation circuit 20A is high, the constant current sources 13 and 14 are turned on to supply the constant current Ib. When the output of the timing generation circuit 20A is low, the constant current sources 13 and 14 are turned off. The timing generation circuit 20A is designed to output a high-level signal when the head selection signal HS1 makes a low-to-high transition (that is, when the MR head 1 is switched to the MR head 51 in the read state). At this time, the constant current sources 13 and 14 are turned on to supply the constant current Ib (See the waveform chart of FIG. 8 indicating operation timing).

As mentioned above, according to the circuitry of the third embodiment, when the MR head 1 is switched to the MR head 51 in a read state (in which the Read/Write control signal R/W is high), the constant current sources 13 and 14 remain on for a given period of time specified by the timing generation circuit 20A. During the given period of time, the emitter currents of the transistors 7 and 8 become larger by the value Tb than the constant current Ia flowing in the original read state (Ia+Ib). As a result, a charge accumulated in the capacitor 9 increases temporarily. During the transition period during which the MR heads are switched, a fluctuation in inter-terminal voltage VC of the capacitor 9 can be minimized (a fluctuation from V0 to V0' in FIG. 8).

The time required for charging the capacitor 9 to a given potential can therefore be shortened greatly. As a result, the transient period during which heads are switched in a read state can be shortened (the transient period is a period tp4 in FIG. 8 which is much shorter than the transient period tp1 in the prior art). The third embodiment can therefore exert the same effect as the first embodiment (See FIGS. 3 and 4).

The present invention has been described in conjunction with the first, second, and third embodiments. However, the present invention is not limited to these embodiments. For example, the constituent features of the embodiments may be properly combined. Such combinations that are not illustrated will be readily devised by a person with ordinary skill in the art.

The third embodiment (See FIG. 7) has been described by taking the two-channel circuitry (that is, the signal reproducing circuit including two MR heads) for instance. Needless to say, the present invention can apply to multi-channel circuitry other than the two-channel circuitry.

What is claimed is:

1. A signal reproducing circuit for a magneto-resistive effect head, comprising:

first and second power lines to which different voltages are applied;

a connection line to which said first power line and one terminal of a magneto-resistive effect head for reproducing a signal from a magnetic recording medium in a read state are connected via a resistor;

a first constant current source, connected to the other terminal of said magneto-resistive effect head via a resistor and connected between said resistor and said second power line, for supplying a sense current to said magneto-resistive effect head in the read state;

a pair of transistors having collectors thereof connected to said first power line via resistors and responding to a voltage developed at one terminal of said magneto-resistive effect head and the other terminal thereof;

second and third constant current sources, connected between the emitters of said pair of transistors and said second power line, for supplying a constant current to said pair of transistors in the read state;

a capacitor connected between the emitters of said pair of transistors;

fourth and fifth constant current sources connected in parallel with said second and third constant current sources; and a circuit for giving control so that when switching from an idle state to the read state is commanded, said fourth and fifth constant current sources remain on for a given period of time.

2. The signal reproducing circuit as set forth in claim 1, further comprising a means for making it possible to externally adjust a potential difference equivalent to the offset voltage to be applied by a dummy head circuit.

3. The signal reproducing circuit as set forth in claim 2, further comprising fourth and fifth constant current sources connected in parallel with said second and third constant current sources, wherein when switching the idle state to the read state is commanded, said fourth and fifth constant current sources remain on for a given period of time.

4. A signal reproducing circuit for a magneto-resistive effect head, comprising:

first and second power lines to which different voltages are applied;

a connection line to which said first power line and one terminal of a magneto-resistive effect head for reproducing a signal from a magnetic recording medium in a read state are connected via a resistor;

a first constant current source, connected to the other terminal of said magneto-resistive effect head via a resistor and connected between said resistor and said second power line, for supplying a sense current to said magneto-resistive effect head in a read state;

a pair of transistors having collectors thereof connected to said first power line via resistors and responding to a voltage developed at one terminal of said magneto-resistive effect head and the other terminal thereof;

second and third constant current sources, connected between the emitters of said pair of transistors and said second power line, for supplying a constant current to said pair of transistors in the read state;

a capacitor connected between the emitters of said pair of transistors; and a dummy head circuit for applying a potential difference equivalent to an offset voltage, which develops at the terminals of said magneto-resistive effect head in the read state, to said capacitor in an idle state.

5. The signal reproducing circuit as set forth in claim 4, further comprising fourth and fifth constant current sources connected in parallel with said second and third constant current sources, wherein when switching the idle state to the read state is commanded, said fourth and fifth constant current sources remain on for a given period of time.

6. A signal reproducing circuit for a magneto-resistive effect head, comprising:

first and second power lines to which different voltages are applied;

a plurality of connection lines to which said first power line and one terminal of each of a plurality of magneto-resistive effect heads for reproducing a signal from an associated magnetic recording medium in a read state are connected via associated resistors;

a plurality or first constant current sources, connected to the other terminals of said plurality of magneto-resistive effect heads via resistors and connected between said resistors and said second power line, each for supplying a sense current to an associated magneto-resistive effect head in the read state when the associated magneto-resistive effect head is selected;

a plurality of pairs of transistors, associated with said plurality of magneto-resistive effect heads, each having collectors thereof connected to said first power line via resistors, and responding to a voltage developed at one terminal of an associated magneto-resistive effect head and the other terminal thereof;

second and third constant current sources, shared by said plurality of pairs of transistors and connected between the emitters of said pairs of transistors and said second power line, each for supplying a constant current to a pair of transistors associated with a selected magneto-resistive effect head in the read state;

a capacitor shared by said plurality of pairs of transistors and connected between the emitters of each of said pairs of transistors;

fourth and fifth constant current sources connected in parallel with said second and third constant current sources; and a circuit for providing control so that when switching one of said plurality of magneto-resistive effect heads to the other is commanded in the read state, said fourth and fifth constant current sources remain on for a given period of time.

* * * * *